United States Patent [19]

Nintz et al.

[11] 3,975,327

[45] Aug. 17, 1976

[54] PARTICULATE, EXPANDABLE SELF-EXTINGUISHING STYRENE POLYMERS SHOWING GOOD PROCESSABILITY

[75] Inventors: Eckhard Nintz; Rupert Schick; Heinrich Horaček, all of Ludwigshafen; Erhard Stahnecker, Ziegelhausen, all of Germany

[73] Assignee: BASF Aktiengesellschaft, Ludwigshafen (Rhine), Germany

[22] Filed: Mar. 18, 1974

[21] Appl. No.: 451,871

[30] Foreign Application Priority Data

Mar. 23, 1973 Germany............................. 2314544

[52] U.S. Cl............................. 260/2.5 B; 260/2.5 E; 260/2.5 FP; 260/2.5 M; 260/45.7 P; 260/45.7 R; 260/890; 260/892; 260/DIG. 24
[51] Int. Cl.²............................................ C08J 9/00
[58] Field of Search..................... 260/2.5 B, 2.5 FP

[56] References Cited
UNITED STATES PATENTS

| | | | |
|---|---|---|---|
| 3,058,926 | 10/1962 | Eichhorn........................ | 260/2.5 B |
| 3,058,929 | 10/1962 | Vanderhoff et al............. | 260/2.5 B |
| 3,505,248 | 4/1970 | Banks et al...................... | 260/2.5 B |
| 3,819,547 | 6/1974 | Pillar et al....................... | 260/2.5 B |

*Primary Examiner*—Richard B. Turer
*Attorney, Agent, or Firm*—Johnston, Keil, Thompson & Shurtleff

[57] ABSTRACT

Particulate, expandable styrene polymers containing a flame-proofing organic halo compound as expanding agent and also a mixture of from 2.5 to 30% by weight of a hydrocarbon of from 3 to 6 carbon atoms and from 97.5 to 70% by weight of monofluorotrichloromethane, based on the total weight of said mixture serving as expanding agent, show good processability and exhibit self-extinguishing properties even during processing.

8 Claims, No Drawings

PARTICULATE, EXPANDABLE SELF-EXTINGUISHING STYRENE POLYMERS SHOWING GOOD PROCESSABILITY

This application discloses and claims subject matter described in German Patent Application No. 23 14 544, filed Mar. 23, 1973, which is incorporated herein by reference.

This invention relates to particulate expandable styrene polymers showing good processability and exhibiting self-extinguishing properties even during processing.

It is known to manufacture shaped articles by foaming particulate, expandable styrene polymers. The method mainly adopted in industry comprises heating the expandable polymer particles in a first stage to temperatures above their softening point until they foam to form a loose bulk material of the desired bulk density. This operation is known as "pre-expansion". The prefoamed material is stored for several hours and then further foamed in a perforated, pressure-tight mold by renewed heating with steam until it forms a sintered molded article of dimensions equal to those of the cavity of the mold used. This second operation is known as "molding". After molding, the article must remain in the mold until its interior has cooled to temperatures below the softening point of the polymer. Another criterion for determining whether the molding may be removed from the mold or not is the fall in interior pressure to approximately atmospheric.

The particulate, expandable styrene polymers or copolymers are obtained either in bead form via suspension polymerization or as granules via extrusion. Commonly used expanding agents for the manufacture of the expandable polymer particles are the pentane isomers in the form of the pure compounds or of mixtures and also, if desired, propane or isomers of butane and hexane. Such expanding agents based on unsubstituted hydrocarbons may be simply and cheaply obtained from refinery by-products and have the advantage over other expanding agents that when incorporated in the expandable styrene polymers they impart good moldability. An important criterion is the pre-expansion rate in the usual equipment. For example, a mixture of 80% by weight of n-pentane and 20% of isopentane produces a rate which is up to 10 times greater than that obtained using an equal of fluorochloro hydrocarbon in the styrene polymer. Furthermore, the above unsubstituted hydrocarbons produce foams of lower density, a fact of great economical significance.

However, such expandable styrene polymers and products made therefrom suffer from the drawback that they are not immediately self-extinguishing in the individual processing stages even after flameproofing halo compounds have been incorporated therein. The foamed articles do not become self-extinguishing until they have stored for several days or even weeks. Thus the flammability of the expandable, hydrocarbon-containing styrene polymer during storage and molding constitutes a certain safety hazard, which may mean an increase in fire insurance premiums.

It is also known to use halo hydrocarbons as expanding agents in the manufacture of expandable styrene homopolymers and copolymers. However, the expandable polymer particles have for example the following disadvantages. In order to obtain similar foamability to that obtained in expandable styrene polymers containing $C_{3-6}$ hydrocarbons as expanding agents, it is necessary to use about twice the weight of, preferably, fluoro hydrocarbons as expanding agents. Furthermore, the minimum density obtained in foaming is in all cases higher than that achieved when using comparable styrene polymers containing $C_{3-6}$ hydrocarbons as expanding agents. Another drawback is that the considerably more expensive halo hydrocarbons, preferably fluoro hydrocarbons, and expandable styrene polymers containing flameproofing halo compounds suffer larger losses of expanding agent during pre-expansion and molding to large shaped articles such as blocks measuring approximately 0.5 × 1 × 1–4 m, than expandable styrene polymers containing $C_{3-6}$ hydrocarbons as expanding agents. As a result, fusion of the particles is greatly impaired and the largest sides of the block sag in to a greater extent.

It is also known to use mixtures of pentanes and difluorodichloromethane "Freon" 12) as expanding agents in the manufacture of flexible foamed polystyrene sheeting by extrusion of expandable styrene polymers. Such polystyrene sheeting, which contains no additional flameproofing organic halo compound, is flammable. Another drawback is that difluorodichloromethane is far less soluble in styrene polymers than monofluorotrichloromethane and thus much greater quantities of difluorodichloromethane are required to achieve the same degree of foamability.

It is an object of the present invention to produce particulate expandable styrene polymers showing good processability and exhibiting self-extinguishing properties during processing.

We have found, surprisingly, that particulate expandable styrene polymers showing good processability and exhibiting self-extinguishing properties during processing are obtained if the expandable styrene polymer contains a flameproofing organic halo compound and, as expanding agent, a mixture of from 2.5 to 30% by weight of a $C_{3-6}$ hydrocarbon and from 97.5 to 70% by weight of monofluorotrichloromethane, based on the total weight of expanding agent.

The particulate, self-extinguishing, expandable styrene polymers obtained in our invention may be prefoamed at the same rate to form material having the same low bulk density as comparable expandable styrene polymers containing isomers of pentane as expanding agents. The expandable styrene polymers have the great advantage that the polymer particles are self-extinguishing even during processing. It has also been found that shaped articles produced from the styrene polymers of the invention by pre-expansion and molding show a relatively low tendency to sag in at the sides and exhibit good fusion of the particles.

Styrene polymers which may be used in the present invention are polystyrene and copolymers of styrene with other α,β-unsaturated compounds containing at least 50% by weight of polymerized units of styrene based on the total weight of the polymer. Examples of suitable comonomers are α-methylstyrene, nuclear-halogenated styrenes, acrylonitrile, acrylates or methacrylates of alcohol of from 1 to 8 carbon atoms, N-vinyl compounds such as vinyl carbazole, maleic anhydride or small mounts of compounds containing two polymerizable double bonds such as butadiene, divinylbenzene and butanediol diacrylate.

The particulate, expandable, self-extinguishing styrene polymers are produced by usual methods. They may be manufactured in the form of beads by suspension polymerization, in the form of granules by extrusion or in the form of lumps as produced by milling bulk polymers. Advantageously, the particles have a diameter of from 0.1 to 6 mm and preferably from 0.4 to 3 mm.

Polymerization is usually initiated by one or more free-radical substances such as t-butyl benzoate, t-butyl perisononanate, di-t-butyl peroxide, dibenzoyl peroxide or mixtures thereof.

The expandable styrene polymers obtained in the present invention contain flameproofing organic halo compounds. Suitable flameproofing agents are bromo compounds such as tetrabromobutane, dibromoethylbenzene, pentabromomonochlorocyclohexane, brominated organic monomers and organic phosphates. Particularly suitable and therefore preferred compounds are, however, the brominated oligomers of butadiene and of isoprene, having a degree of polymerization of from 2 to 2,000. These compounds may be completely or partially brominated. Typical representatives are for example 1,2,5,6-tetrabromocyclooctane, 1,2,5,6,9,10-hexabromocyclododecane and brominated polybutadiene. The flameproofing agents are usually employed in amounts of from 0.2 to 3% by weight and preferably from 0.4 to 1% by weight of the total weight of the polymer. It may also be advantageous to supplement the flameproofing agents by synergistic substances such as di-t-butyl peroxide, dicumyl peroxide and poly-p-diisopropylbenzene.

An important feature of the expandable self-extinguishing styrene polymers is that they contain, in addition to the flameproofing organic halo compound, a mixture of from 97.5 to 70% by weight and preferably from 95 to 75% by weight of monofluorotrichloromethane and from 2.5 to 30% and preferably from 5 to 25% by weight of a $C_{3-6}$ hydrocarbon, based on the total weight of this expanding agent, which is homogeneously distributed throughout the styrene polymer. Suitable expanding agents are for example normally gaseous or liquid halo hydrocarbons and hydrocarbons of from 3 to 6 carbon atoms which are non-solvents for the styrene polymer and have boiling points below the softening point of the polymer. Due to its good solubility in styrene polymers, a suitable halo hydrocarbon is monofluorotrichloromethane. Suitable $C_{3-6}$ hydrocarbons are for example propane and the isomers or isomer mixtures of butane, pentane and hexane. We prefer to use n-pentane and/or isopentane and isobutane. The mixture of expanding agents, which may be incorporated in the products during or after polymerization, is generally present in the expandable styrene polymers in an amount of from 3 to 15 and preferably from 5 to 12% by weight, based on the total weight.

The expandable styrene polymers may also contain additives such as dyes, lubricants, fillers, plasticizers, stabilizers and cell modifiers, for example ethoxylation products of primary or secondary amines and ethylene oxide for the manufacture of dimensionally stable shaped articles.

The prefoamed polymer particles obtained from particulate expandable self-extinguishing styrene polymers of the invention may be immediately used for packaging purposes in place of wood-wool or as an upholstery material. The prefoamed particles may also be sintered by heating in molds which are not gas-tight when closed to form foamed articles having dimensions corresponding to those of the cavity of the mold used.

In the following Examples the parts are by weight.

EXAMPLE 1

A mixture of

| | |
|---|---|
| water of hardness 15°dH | 480 kg |
| sodium pyrophosphate | 360 g |
| styrene | 405 kg |
| t-butyl perbenzoate | 1.19 kg |
| dibenzoyl peroxide | 330 g |
| dicumyl peroxide | 820 g |
| 1,2,5,6,9,10-hexabromocyclododecane | 2.65 kg | is polymerized in a 1,000 liter pressure vessel equipped with stirrer and purged with nitrogen, for 3 hours at 90°C, 1 hour at 100°C, 1 hour at 110°C and then 5 hours at 115°C, with stirring. During the heating period from 90° to 115°C, 15 kg of a 10% w/w aqueous polyvinyl pyrrolidone solution having a K value of 90 are added to the reaction mixture. After a polymerization time of 3.5 hours, an expanding agent mixture consisting of 33 kg of monofluorotrichloromethane and 8.2 kg of pentane is added to the reaction mixture over 15 minutes. The expandable polystyrene produced in this way is prefoamed in conventional prefoamers to form material having a density of 12 g/l.

The foamed particles are placed in a coarse-mesh brass basket having a capacity of approximately 0.5 l and are subjected to a burning test. This test consists in applying a 5–6 cm long Bunsen burner flame to the prefoamed particles for 3 seconds. After removal of the flame, the foamed beads burn for a further 0.6 to 0.9 sec.

EXAMPLE 2

A mixture of

| | |
|---|---|
| water of hardness 15° dH | 480 kg |
| sodium pyrophosphate | 360 g |
| styrene | 385 kg |
| acrylonitrile | 21 kg |
| t-butyl perbenzoate | 1.11 kg |
| dibenzoyl peroxide | 440 g |
| dicumyl peroxide | 820 g |
| pentabromomonochlorocyclohexane | 4.1 kg | is polymerized in a 1,000 liter pressure vessel equipped with stirrer and purged with nitrogen, for 4 hours at 85°C, 2 hours at 100°C, 1 hour at 110°C and 4 hours at 115°C. After a polymerization time of 1 hour at 85°C, 13 kg of a 10% w/w aqueous polyvinyl pyrrolidone solution having a K value of 90 are added to the reaction mixture, and after a polymerization time of 4 hours an expanding agent mixture consisting of 31 kg of monofluorotrichloromethane and 8.2 kg of pentane is added to the reaction mixture over 15 minutes. The resulting expandable styrene copolymer is prefoamed to form a material having a density of 12 g/l, which is subjected to the burning test described in Example 1. The prefoamed beads exhibit a burning time of from 0.8 to 1.2 sec.

EXAMPLE 3

An expandable styrene polymer is manufactured in a manner similar to that described in Example 1 except that 3.5 hours after the reaction mixture has reached a reaction temperature of 90°C an expanding agent mixture consisting of 29 kg of monofluorotrichloromethane and 10.3 kg of pentane is added thereto over 15 minutes. The prefoamed beads have a density of 12 g/l and a burning time of from 1.2 to 1.5 sec.

EXAMPLE 4

An expandable styrene polymer is manufactured in a manner similar to that described in Example 1 except that 3.5 hours after the reaction mixture has reached the reaction temperature of 90°C an expanding agent mixture consisting of 33 kg of monofluorotrichloromethane and 6.2 kg of pentane is added thereto. The prefoamed product has a density of 12 g/l and a burning time of from 0.6 to 0.8 sec.

EXAMPLE 5

An expandable styrene polymer is manufactured in a manner similar to that described in Example 1 except that 3.5 hours after the reaction mixture has reached a reaction temperature of 90°C an expanding agent mixture of 33 kg of monofluorotrichloromethane and 6 kg of n-hexane is added thereto and in place of hexabromocyclododecane as flameproofing agent 6.5 kg of tris-dibromopropylphosphate are used. The prefoamed product has a density of 12 g/l and a burning time of from 1.0 to 1.2 sec.

EXAMPLE 6

100 parts of polystyrene produced by solution polymerization and having a K value of 63 (determined by the method proposed by H. Fikentscher in Cellulosechemie 13, 1932, page 58) are melted, together with 2.5 parts of hexabromocyclododecane, in a heated twinworm extruder and directly impregnated with 7 parts of an expanding agent mixture consisting of 80% by weight of monofluorotrichloromethane and 20% by weight of pentane isomers comprising 85% w/w of n-pentane and 15% w/w of isopentane. The homogenized melt containing expanding agent is extruded through a die having orifices of 8 mm in diameter. The extrudates immediately pass through a water bath having a temperature of 20°C, the residence time therein being 18 sec. The disc-like granules produced by means of conventional granulating equipment have the approximate dimensions 7 × 7 × 2 mm.

The fine granules are treated with steam to give uniform, free-flowing foamed particles having a density of 10 g/l. Their burning time is from 0.5 to 1.0 sec.

EXAMPLE 7

A expandable styrene polymer is manufactured by a method similar to that described in Example 1 except that 3.5 hours after the reaction mixture has reached a reaction temperature of 90°C 30 kg of a mixture consisting of 75% by weight of n-pentane and 25% by weight of isopentane are added thereto.

The prefoamed product has a density of 12 g/l and burns away completely when the source of ignition is removed.

EXAMPLE 8

An expandable styrene polymer is made in a manner similar to that described in Example 1 except that 3.5 hours after the reaction mixture has reached a reaction temperature of 90°C 45 kg of monofluorotrichloromethane are added.

The prefoamed product has a density of 17 g/l and a burning time of from 0.6 to 0.8 sec.

However, it is a disadvantage that in spite of the very large amount of expanding agent used, this product requires a foaming time in a pressure foamer which is about twice as long as that required by similar products containing $C_{3-6}$ hydrocarbons or mixtures thereof with monofluorotrichloromethane as expanding agents in order to achieve the same density.

Shaped articles are made from the expandable polymers obtained as described in Examples 1 to 5 and 7 and 8. This is done by foaming an aliquot of the expandable polymer in a stream of steam to give a bulk density of 15 g/l, whereupon the prefoamed polymer particles are temporarily stored for 24 hours with access to air. The prefoamed polymer particles are then shaped in a pressure-tight block mold which is not gas-tight when closed, under the action of steam, to give foamed blocks measuring 100 × 50 × 100 cm. The main properties of the prefoamed polymer particles and of the said shaped articles are listed in the Table below.

The Table shows that shaped articles made from expandable styrene polymers as described in Examples 1 to 5 and 8 are self-extinguishing immediately after manufacture and have a burning time of less than 3 sec. By contrast, shaped articles made from expandable polymers as described in Example 7 are still flammable after a storage time of 1 week. The burning time is determined by the test method described in German Published Application No. 1,255,302.

TABLE

| Ex. | Foaming rate in prefoaming at steam pressure 0.3 atm. gage (sec.) a) | Density after steaming for 6 min. (measured at atm. pressure) g/l | Steam pressure in mold (atm. gage) | Steaming time (sec.) ) | Degree of interwelding (%) c) | Sag of total sides (%) d) |
|-----|---|---|---|---|---|---|
| 1 | 34 | 10.0 | 0.5 | 50 | 50 | 2.0 |
|   |    |      | 0.4 | 90 | 45 | 1.5 |
| 2 | 37 | 11.0 | 0.5 | 50 | 60 | 2.3 |
|   |    |      | 0.4 | 90 | 45 | 2.0 |
| 3 | 33 | 10   | 0.5 | 50 | 60 | 2.5 |
|   |    |      | 0.4 | 90 | 40 | 1.8 |
| 4 | 35 | 10   | 0.5 | 50 | 55 | 2.4 |
|   |    |      | 0.4 | 90 | 55 | 1.6 |
| 5 | 34 | 11.5 | 0.5 | 50 | 30 | 1.8 |
|   |    |      | 0.4 | 90 | 20 | 1.4 |
| *7 | 33 | 10  | 0.5 | 50 | 60 | 1.4 |
|   |    |      | 0.4 | 90 | 30 | 1.0 |
| *8 | 65 | 17  | 0.5 | 50 | 30 | 6.5 |

TABLE-continued

| Ex. | Foaming rate in prefoaming at steam pressure 0.3 atm. gage (sec.) a) | Density after steaming for 6 min. (measured at atm. pressure) g/l | Steam pressure in mold (atm. gage) | Steaming time (sec.) b) | Degree of inter-welding (%) c) | Sag of total sides (%) d) |
|---|---|---|---|---|---|---|
| | | | 0.4 | 90 | 20 | 2.2 |

Comparative Examples a) Initial weight of sample 9 kg. desired final density 15 g/l.

b) The steaming time is the time from the moment at which the specified steam pressure is achieved in the block mold to the moment of closing the steam inlet valve.

c) The degree of fusion is the ratio of the number of torn beads to the total number of beads in the surface of a fracture produced by force.

d) Sag of the sides is measured 24 hours after the block had been removed from the mold. It is determined by measuring the thickness of the block in the center of one of the large sides at right-angles thereto. The difference between the inside dimention of the mold at this point and the thickness of the molding at the same point, converted to percent of the said inside dimension of the mold, gives the degree of sag.

We claim:

1. Expandable, self-extinguishing particles of polymers containing at least 50% by weight of polymerized units of styrene, said particles containing from 0.2 to 3% by weight of a flame-proofing compound selected from the group consisting of tetra-bromobutane, dibromoethylbenzene, pentabromomonochlorocyclohexane, brominated organic monomers and brominated organic phosphates, and brominated oligomers of butadiene and of isoprene, having a degree of polymerization of from 2 to 2,000, said particles further containing from 3 to 15% by weight of an expanding agent of from 2.5 to 30% by weight of a hydrocarbon of from 3 to 6 carbon atoms and from 97.5 to 70% by weight of monofluorotrichloromethane, based on the total weight of the expanding agent.

2. Expandable particles as set forth in claim 1, wherein said flameproofing compound is selected from the group consisting of 1,2,5,6-tetrabromocyclooctane, 1,2,5,6,9,10-hexabromocyclododecane and brominated polybutadiene.

3. Expandable particles as set forth in claim 1, wherein from 0.4 to 1% by weight of flameproofing compound is incorporated in said particles, and wherein the amount of expanding agent is from 5 to 12% by weight.

4. Expandable particles as set forth in claim 3, wherein said expanding agent is made up from 5 to 25% by weight of hydrocarbon and from 95 to 75% by weight of monofluorotrichloromethane.

5. Particulate, expandable, self-extinguishing styrene polymers as set forth in claim 1, wherein the expanding agent mixture contains, as $C_{3-6}$ hydrocarbon, isobutane and n-pentane and/or isopentane.

6. Particulate, expandable, self-extinguishing styrene polymers as set forth in claim 1, wherein the expanding agent mixture consists of n-pentane and/or isopentane and monofluorotrichloromethane.

7. A process for the manufacture of particulate, expandable, self-extinguishing styrene polymers which comprises mixing an expanding agent of from 2.5 to 30% by weight of monofluorotrichloromethane, based on the total weight of the mixture into a styrene polymer containing a flameproofing organic halo compound selected from the group consisting of tetrabromobutane, dibromoethylbenzene, sentabromomonochlorocyclohexane, brominated organic monomers and brominated organic phosphates, and brominated oligomers of butadiene and of isoprene, having a degree of polymerization of from 2 to 2,000, said mixing of said expanding agent into said styrene polymer taking place during or after polymerization.

8. A process for the manufacture of particulate, expandable, self-extinguishing styrene polymers, wherein the styrene polymers containing a flameproofing organic halo compound selected from the group consisting of tetrabromobutane, dibromoethylbenzene, pentabromomonochlorocyclohexane, brominated organic monomers and brominated organic phosphates, and brominated oligomers of butadiene and of isoprene, having a degree of polymerization of from 2 to 2,000 are melted and are extruded in the presence of an expanding agent mixture consisting of from 2.5 to 30% by weight of a hydrocarbon of from 3 to 6 carbon atoms and from 97.5 to 70% by weight of monofluorotrichloromethane, based on the total weight of expanding agent.

* * * * *